Oct. 28, 1924.
A. E. ROUVIER
1,513,524

BRAKE MECHANISM APPLICABLE TO THE STEERING OR FRONT WHEELS OF AUTOMOBILES

Filed Jan. 4, 1922
2 Sheets-Sheet 1

Inventor
A. Elizalde Rouvier.
by
W. E. Evans
Attorney.

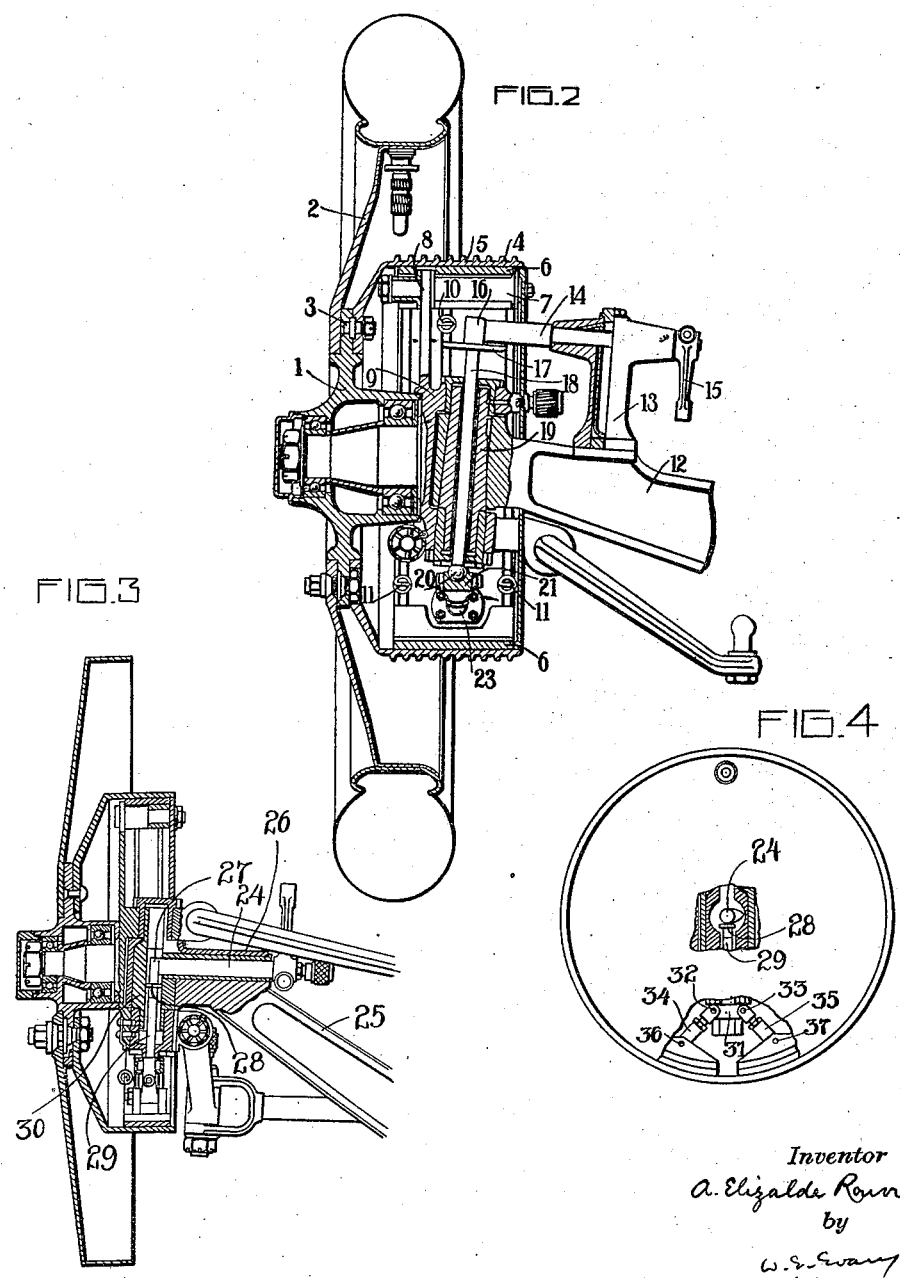

Patented Oct. 28, 1924.

1,513,524

UNITED STATES PATENT OFFICE.

ARTURO ELIZALDE ROUVIER, OF BARCELONA, SPAIN.

BRAKE MECHANISM APPLICABLE TO THE STEERING OR FRONT WHEELS OF AUTOMOBILES.

Application filed January 4, 1922. Serial No. 527,033.

*To all whom it may concern:*

Be it known that I, ARTURO ELIZALDE ROUVIER, a subject of the King of Spain, residing at 149 Paseo de San Juan, Barcelona, Spain, have invented certain new and useful Improvements Relating to Brake Mechanism Applicable to the Steering or Front Wheels of Automobiles, of which the following is a specification.

The subject matter of this application relates to brake mechanism applicable to the steering or front wheels of automobiles.

The invention involves the special disposition of the operating elements which are combined in such manner that the operation is independent of the positions the front wheels occupy relatively to the front fixed axle or transverse member upon which they are mounted.

The brake mechanism provided according to the invention comprises essentially two principal groups of elements: those of the brake properly so called, and those of its operating mechanism.

The first group comprises: the brake drum fixed to the hub of the wheel, and the brake shoes which are articulated at their upper ends with a spindle solid with a suitable extension provided upon the hollow pivot pin of the wheel.

Springs conveniently disposed tend constantly to separate the brake shoes from the drum, the brake shoes being connected at their lower parts with a member through which the braking operation is transmitted. For this purpose the mechanism comprises a rod which extends actually through the hollow pivot pin by which the wheel is connected to the front fixed axle of the vehicle. This rod is jointedly connected at its lower end with the transmission member above referred to, while at its upper end it is provided with a disc upon which acts tangentially a cam mounted upon a spindle which is operated by the driver from his seat through any suitable known mechanism. When the spindle turns upon which the cam is mounted, the disc and rod are caused to move downwardly as well as the transmission member. The brake shoes thus separate and coming into contact with the internal face of the drum cause the braking of the wheel.

As will be understood, whatever the position of the wheel by reference to the front axle, the cam will act tangentially upon the disc at the extremity of the rod and cause the operation of the brake.

The invention is illustrated by way of example in the accompanying drawings which illustrate two constructions according to the invention.

Figure 2 is a vertical section on the line A—A of Figure 1.

Figure 3 represents another construction of brake mechanism according to the invention and represents a vertical section in a plane parallel with the front axle, and Figure 4 is a front view of the brake drum with two parts broken away to expose part of the internal elements of the brake mechanism.

Figure 1:
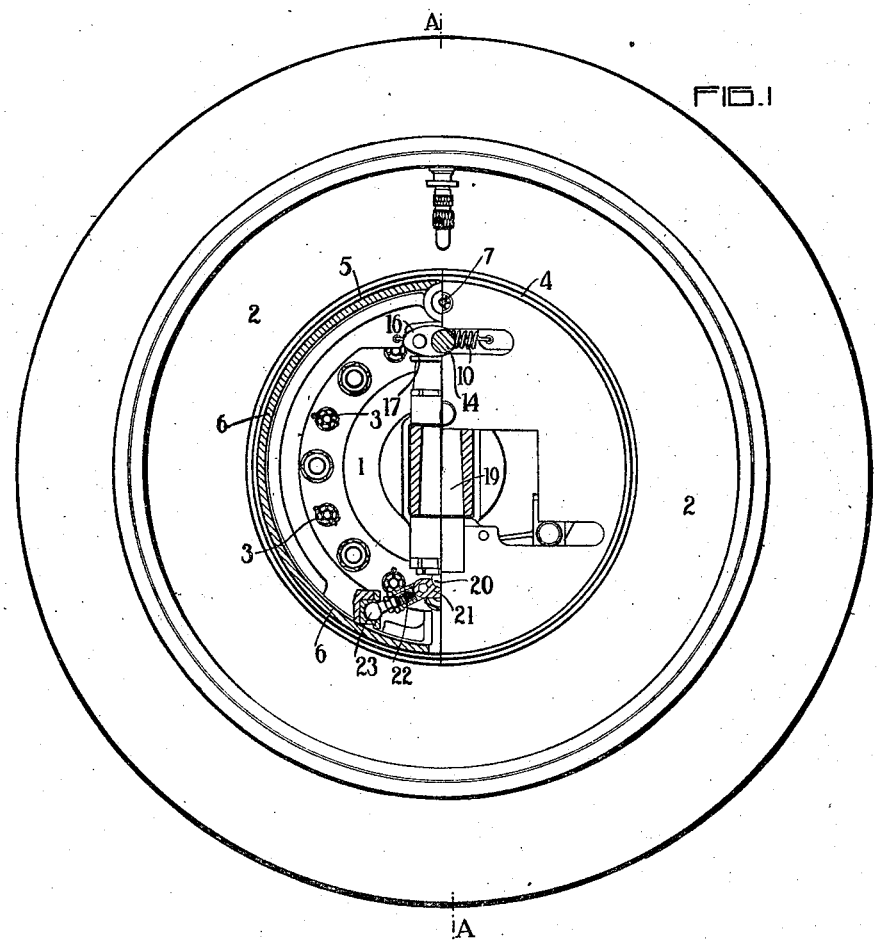
Figure 1 is a front view of a wheel provided with brake mechanism according to the invention.

Upon the hub 1 of the wheel 2 (Figures 1 and 2) is fixed by means of bolts 3, the brake drum 4, against the cylindrical surface 5 of which act the brake shoes 6, articulated at their upper ends upon a pivot 7 solid with an extension 8 of the pivoting boss 9 of the wheel. Springs 10, 11 tend constantly to separate the brake shoes 6 from the drum.

Secured to the transverse member or fixed front axle 12 of the vehicle is the bracket 13 for the spindle 14 which is provided with a lever 15 controlled by the driver through a suitable mechanism and with an eccentric or cam 16 which rests against and operates upon a disc 17, having a rod 18 extending beneath it and passing through the central pivot pin 19 forming the articulation of the wheel 2 with the fixed front transverse member 12 of the chassis. This rod 18 is articulated at its lower end by means of a universal joint 20 with a member 21 to which, by means of members 22 also provided with the universal joints 23, the brake shoes 6 at their lower ends are connected.

From the foregoing it will be understood that when the driver operates the lever 15, the cam or eccentric 16 will act upon the disc 17 and force it, whatever the position of the wheel 2, for notwithstanding the variations of these positions, the tangence of the cam 16 upon the disc 17 is not lost or altered.

In the construction illustrated in Figures 3 and 4, the mechanism is somewhat simplified especially with regard to the mounting of the cam spindle through which the braking operation is effected.

The brake operating spindle 24 passes through a hole provided in the extremity of the front axle 25, within which hole is mounted a sleeve 26 serving for the connection, for the rotation of the spindle 24. The cam 27 operates upon a disc 28 mounted at the extremity of the rod 29 which is lodged within the central pivot pin 30 of the wheel.

A member 31 fixedly mounted at the end of the rod 29 carries jointed to it at 32, 33, the rods 34, 35 connected by joints at the opposite ends 36, 37 respectively, with the brake shoes 38 and 39.

When by the action of the spindle 24, the cam 27 is turned, the disc 28 and the rod 29 are caused to move downwardly, and the rods 34, 35 force the brake shoes 38, 39 to open, and these are then applied against the brake drum 40 so as thus to effect the braking of the wheel.

The corresponding springs not represented in the drawing provided as usual separate the brake shoes 38, 39 from the drum on the brake ceasing to be operated.

The mechanism represented may be modified with respect to the form and disposition of the parts of which it is constituted, without affecting the essential features of the invention.

I claim:

1. Brake mechanism applicable to the front steering wheels of automobiles, consisting in combination of the wheel and axle, a brake drum concentrically mounted thereon, the fixed axle of the chassis, means by which the said wheel and axle are pivotally mounted to turn upon the said fixed axle comprising a pivot pin, brake shoes mounted within said brake drum, a rod axially mounted within the said pivot pin and adapted to have an axial movement therein, means by which the said rod is connected to the brake shoes, and means by which axial movement is imparted to the said rod comprising a spindle disposed parallel with the axis of the wheel and axle, the axis of the said spindle intercepting the axis of the said rod, substantially as described.

2. Brake mechanism applicable to the front steering wheels of automobiles, consisting in combination of the wheel and axle, a brake drum concentrically mounted thereon, the fixed axle of the chassis, means by which the said wheel and axle are pivotally mounted to turn upon the said fixed axle comprising a pivot pin, brake shoes mounted within said brake drum, a rod axially mounted within the said pivot pin and adapted to have an axial movement therein, means by which the said rod is connected to the brake shoes, and means by which axial movement is imparted to the said rod comprising a spindle disposed parallel with the axis of the wheel and axle, and a cam mounted upon the said spindle and adapted to engage the said rod, the axis of the said spindle intercepting the axis of the said rod, substantially as described.

ARTURO ELIZALDE ROUVIER.